US010846730B2

(12) United States Patent
Key et al.

(10) Patent No.: US 10,846,730 B2
(45) Date of Patent: Nov. 24, 2020

(54) COMMUNITY LOYALTY REWARD APPLICATION AND SYSTEM AND METHOD OF TREATING DISEASE AND ILLNESS

(71) Applicant: New-Tech Computer Systems, Inc., Shreveport, LA (US)

(72) Inventors: Jeff Key, Benton, LA (US); Stephen Culver, Shreveport, LA (US); Paul Francis Carrig, Shreveport, LA (US)

(73) Assignee: PIONEER RX, LLC, Shreveport, LA (US)

( * ) Notice: Subject to any disclaimer, the term of this patent is extended or adjusted under 35 U.S.C. 154(b) by 146 days.

(21) Appl. No.: 15/367,736

(22) Filed: Dec. 2, 2016

(65) Prior Publication Data

US 2017/0161771 A1 Jun. 8, 2017

Related U.S. Application Data

(60) Provisional application No. 62/263,284, filed on Dec. 4, 2015.

(51) Int. Cl.
*G06Q 30/02* (2012.01)
*G06Q 50/22* (2018.01)

(52) U.S. Cl.
CPC ..... *G06Q 30/0232* (2013.01); *G06Q 30/0279* (2013.01); *G06Q 50/22* (2013.01)

(58) Field of Classification Search
CPC . G06Q 30/02; G06Q 30/0232; G06Q 30/0279
See application file for complete search history.

(56) References Cited

U.S. PATENT DOCUMENTS

| | | | |
|---|---|---|---|
| 10,204,704 B1 * | 2/2019 | Wurst | G16Z 99/00 |
| 2004/0210341 A1 * | 10/2004 | Wallace | G06F 19/326 |
| | | | 700/237 |
| 2006/0122856 A1 † | 6/2006 | Rushton | |
| 2013/0226608 A1 * | 8/2013 | Di Lascia | G06F 19/3456 |
| | | | 705/2 |

(Continued)

OTHER PUBLICATIONS

Eysenbach et al., "The Effectiveness of Loyalty Rewards to Promote the Use of an Internet-Based Heart Health Program" (published in Journal of Medical Internet Research, Jul. 2, 2014) (Year: 2014).*

*Primary Examiner* — James M Detweiler
*Assistant Examiner* — Patrick Kim
(74) *Attorney, Agent, or Firm* — Davis & Bujold PLLC; Michael J. Bujold

(57) ABSTRACT

A community loyalty rewards system comprising a mobile device, a central server, and a pharmacy server. The mobile device has instructions stored on a mobile device memory that causes a mobile device processor to track health related activities, receive points for such activities, and push point data to the central server and pull status data from the central server. The pharmacy server has instructions stored on a pharmacy server memory that causes a pharmacy server processor to pushes campaign data to the central server and pull user point and status data from the central server. One of the pharmacy server processor and a central server processor determine a charity that receives the points.

20 Claims, 15 Drawing Sheets

(56) References Cited

U.S. PATENT DOCUMENTS

| | | | |
|---|---|---|---|
| 2014/0304056 A1* | 10/2014 | Postrel | G06Q 30/0601 |
| | | | 705/14.27 |
| 2015/0154628 A1† | 6/2015 | Dufour | |
| 2015/0216413 A1* | 8/2015 | Soyao | G16H 20/60 |
| | | | 709/204 |
| 2015/0221001 A1† | 8/2015 | Kircher | |
| 2016/0292456 A1* | 10/2016 | Dubey | G06F 16/21 |

\* cited by examiner
† cited by third party

FIG 3

COMMUNITY LOYALTY REWARD APPLICATION AND SYSTEM AND METHOD OF TREATING DISEASE AND ILLNESS

FIELD OF THE INVENTION

The present invention relates generally to a community loyalty reward application and system for local pharmacies, including methods, systems, apparatus and computer program products for implementing the same, and methods of treating illnesses and diseases.

BACKGROUND OF THE INVENTION

Merchants provide their customers with a customer loyalty rewards program that rewards customer purchases. Local pharmacies though, have yet to successfully exploit the synergistic benefits of matching extra-financial and potentially health beneficial customer activities with preferably fixed length contests benefiting local groups, charities, and/or organizations to increase customer loyalty, customer base, customer health, and community and customer goodwill.

SUMMARY OF THE INVENTION

Wherefore, it is an object of the present invention to overcome the above mentioned shortcomings and drawbacks associated with the prior art.

Another object of the present invention is to provide a preferably local pharmacy a method and device to increase its customer base and business, increase customer loyalty, encourage medication adherence and healthy habits, and build goodwill with customers and a local community.

A further object of the present invention is to provide a mobile application and/or website for pharmacy customers to compete or participate in a campaign or contest individually or in pluralities to win a pharmacy committed and preferably capped monetary contribution to a single or plurality of local groups, charities, and/or organizations, based on customer participation in various pharmacy sponsored or approved preferably health related activities. The campaigns will preferably have a predetermined duration (e.g. monthly or quarterly). The pharmacy preferably chooses local groups, local charities, and/or local community organizations (rather than national groups, charities, or organizations), and thereby becomes more tightly associated with the local community and stimulates community goodwill, and thereby increases local customer loyalty and market share, especially as compared to national pharmacy chains.

The present invention also relates to a method to treat, among other illnesses and diseases: obesity, depression, isolation, and heart disease in humans through, among other things, increased group engagement, exercise, community/charity involvement, prescription fidelity, empowerment, and pharmacist counseling.

The present invention also relates to a method to increase patient medication adherence.

The present invention also relates to a method to increase community awareness of local groups, charities, and organizations.

The present invention further relates to a community loyalty rewards application and system comprising a mobile application installed on a mobile device and/or website hosted on a web server and accessed through a web browser installed on a mobile or non-mobile computing device; a central server; and a pharmacy server. The mobile device has instructions stored on a mobile device memory that causes a processor to track health related activities, receive points for such activities, and push point data to the central server and pulls status data from the central server. The mobile application and/or website are used to display and capture information related to the system. The pharmacy server pushes campaign data to the central server and pulls user point and status data from the central server. A processor of one of the pharmacy server and the central server determine a charity that has received the most points as a winner of the campaign.

BRIEF DESCRIPTION OF THE DRAWINGS

The accompanying drawings, which are incorporated in and constitute a part of the specification, illustrate various embodiments of the invention and together with the general description of the invention given above and the detailed description of the drawings given below, serve to explain the principles of the invention. It is to be appreciated that the accompanying drawings are not necessarily to scale since the emphasis is instead placed on illustrating the principles of the invention. The invention will now be described, by way of example, with reference to the accompanying drawings in which:

FIGS. 3-15 illustrate exemplary display pages of a pharmacy or customer/user interface for implementing a community loyalty rewards application, in accordance with embodiments of the invention.

FIG. 3 illustrates an exemplary user interface with options available to a pharmacy system for managing the campaign of the community loyalty rewards application.

FIG. 4 illustrates exemplary user interfaces with different options the community loyalty rewards application could be configured with to determine how points are distributed to dollar amounts.

FIG. 5 illustrates an exemplary user interface within a pharmacy management system where labs could be configured, with specific configuration options available for the community loyalty rewards application.

FIG. 6 illustrates an exemplary user interface within a pharmacy management system where labs for a specific patient are viewed and/or recorded, including specific data elements related to the community loyalty rewards application.

FIG. 7 illustrates an exemplary user interface within a pharmacy management system where activities of the community loyalty rewards application can be configured as to how points are to be allocated for each activity.

FIG. 8 illustrates an exemplary user interface within a pharmacy management system where points of the community loyalty rewards application can further be controlled by departments within the pharmacy's inventory.

FIG. 9 illustrates an exemplary user interface of a pharmacy's point of sale (POS) system where prompts can be used to educate patients about the community loyalty rewards application and options to enroll or edit their settings.

FIG. 10 illustrates an exemplary user interface within a pharmacy management system of a patient's information where status and settings for the patient for the community loyalty rewards application are shown and edited.

FIG. 11 illustrates an exemplary user interface within a pharmacy management system with an interface showing the configuration of a group, charity, or organization that is part of a campaign in the community loyalty rewards application.

FIG. 12 illustrates an exemplary user interface for a pharmacy showing a dashboard of high level information related to the status of the community loyalty rewards application.

FIG. 13 illustrates an exemplary user interface for a customer viewable portion of a point of sale (POS) such as a signature pad, customer display, tablet or other device that they can sign on. This interface shows examples of how a user might be prompted with options and ability to change those options for the community loyalty rewards application.

FIG. 14 illustrates another exemplary user interface for a customer viewable portion of a point of sale (POS) in an mobile interface such as a delivery mobile application.

FIG. 15 illustrates another exemplary user interface for the mobile device application that a user utilizes to interface with the community loyalty rewards application.

DETAILED DESCRIPTION OF THE INVENTION

The present invention will be understood by reference to the following detailed description, which should be read in conjunction with the appended drawings. It is to be appreciated that the following detailed description of various embodiments is by way of example only and is not meant to limit, in any way, the scope of the present invention.

Figure 1:
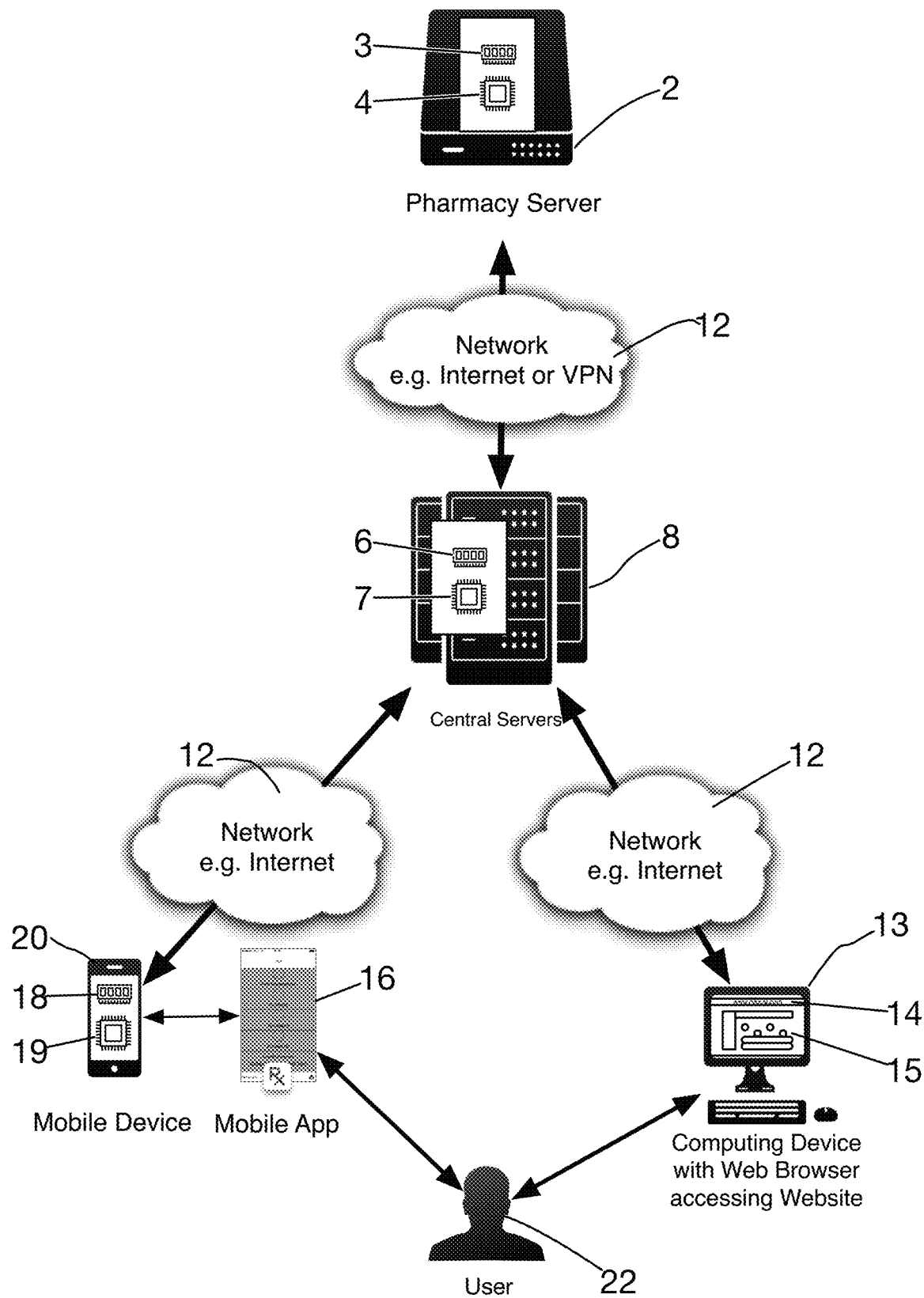
FIG. 1 is a flow diagram illustrating a process flow for an apparatus for implementing a community loyalty rewards application, in accordance with embodiments of the invention.

Turning now to FIG. 1, a brief description concerning the various components of the present invention will now be briefly discussed. As can be seen in this embodiment the community loyalty application system involves a mobile device 20 with mobile application 16, of a user 22, and/or a computing device 13 with web browser 14, a remote non-pharmacy central server or plurality of servers referred to as the central server 8, that exchanges data with the mobile device 20 or web browser 14 via a wide area network 12, e.g. the Internet or Virtual Private Network (VPN), and a pharmacy server 2, that exchanges data with the central server 8 via the network 12. As a security feature the pharmacy server 2 preferably does not connect directly with the mobile device 20 or web browser 14 via the network 12 or vice versa, but rather the pharmacy server 2 preferably is required to exchange data with the mobile device 20 or web browser 14 via the central server 8 and network 12. Also preferably, no user, charity, or campaign data is pulled from the pharmacy server 2 to the central pharmacy server 2, with such data preferably being pushed from the pharmacy server 2 as needed. The pharmacy server 2 preferably initiates all transfers of user, charity, or campaign data between the pharmacy server 2 and the central server 8. As one benefit of one embodiment of the present invention, this security feature is, among other things, a technical solution to the technical problem of maintaining data security while allowing for data transmission to facilitate conducting the described process in an efficient, yet technically safe manner.

Figure 2:
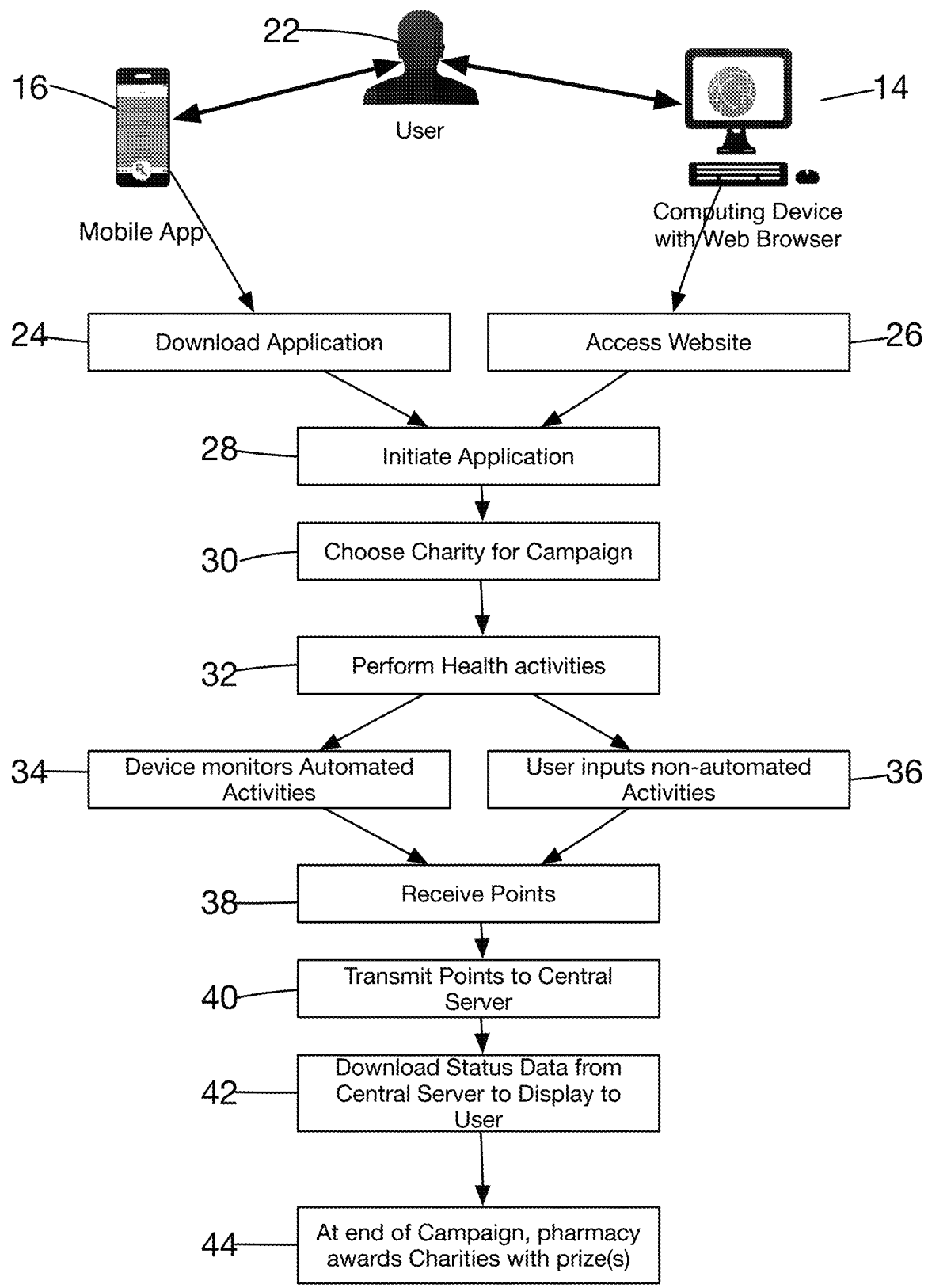
FIG. 2 is a block diagram illustrating technical components of a system for implementing a community loyalty mobile rewards system, in accordance with an embodiment of the present invention.

As shown on FIG. 2, several processes and events occur throughout the cycle of the community loyalty reward application and system. A brief description of this cycle is listed here, with details in the paragraphs to follow. A user 22 interacts with the mobile application 16 and/or website 15 running on a computing device 13, preferably having a processor and memory, with a web browser 14. Looking at the mobile application 16, the mobile application 16 is downloaded 24 to the mobile device 20. The mobile application 16 instructions will be stored in a mobile memory 18 on the mobile device 20, and will be run via a mobile processor 19 on the mobile device 20. Looking now at the website 15, the user 22 will access the website 26 using a web browser 14 and navigating to the website 15 via standard methods, e.g. links, shortcuts, bookmarks, URLs. The website 15 application will be stored on Central Servers 8 and run via one or more central server processors 7. The web browser 14 will run instructions initiated from the website 15 and stored locally in memory on the user's 22 local computing device 13. Pharmacy application instructions will be stored in a pharmacy memory 3 of the pharmacy server 2 and will run via a pharmacy processor 4 on the pharmacy server 2. Central server application instructions will be stored in a central server memory 6 and will run via a central server processor 7 on the central server 8. Once the mobile application 16 and/or website 15 application have been downloaded to the mobile device 20 and/or web browser 14, the user 22 initiates the application 28 by opening the mobile application 16 on the mobile device 20 or allowing the website 15 to load its one or more pages. The user 22 can choose their charity for the campaign 30. Charity can refer to an official charity, or a group or organization that the pharmacy has chosen to take part in the campaign. Users 22 then perform health activities 32 in various forms. The mobile device 20 or website 15 monitors activities automatically 34 or the user 22 inputs non-automated activities 36 into the system. These activities are awarded a certain number of points 38 based on the configurations set in place by the pharmacy server 2. These activities and points are transmitted 40 to the central server 8. The central server 8 is also responsible for allowing the mobile device 20 or web browser 14 to download status data 42 for display to the user 22. At the end of the campaign, the pharmacy server 2 is used to award the prizes based on options provided to the pharmacy 44. It is understood that the mobile device 20, especially one with web browsing capabilities, may also function as a local computing device 15.

User 22:

The community loyalty application system includes a user 22. The user 22 can be a customer, patient, or other person related to a customer or patient of the pharmacy who utilizes the system.

Mobile Device 20:

The community loyalty reward application and system includes a user 22 and a user 22 mobile device 20 with mobile application 16, a pharmacy server 2, a central server 8, and a plurality of networks 12. It will be understood that the user 22 has access to the mobile device 20.

The pharmacy server 2, the central server 8, and the mobile device 20 are each operatively and selectively connected to a network 12, which may include one or more separate networks. In addition, the network 12 may include a local area network (LAN), a wide area network (WAN), and/or a global area network (GAN), such as the Internet. It will also be understood that the network 12 may be secure and/or unsecure and may also include wireless and/or wireline technology, though preferably all data transmitted over a network 12 will be transmitted securely.

The mobile device 20 may include any computerized apparatus that can be configured to perform any one or more of the functions of the mobile device 20 described and/or contemplated herein. Such a mobile device 20 may include, but is not limited to, a cellular telecommunications device (i.e., a cell phone or mobile phone), personal digital assistant (PDA), smartphone, a mobile Internet accessing device, or other mobile device including, but not limited to portable digital assistants (PDAs), pagers, gaming devices, laptop computers, tablet computers, and any combination of the aforementioned, or the like. In accordance with some embodiments of the present invention, the mobile device 20 includes a mobile communication interface, a mobile processor 19, a mobile memory 18 having a mobile application 16 stored therein, a positioning system device, such as a GPS device, and a mobile user interface. In such embodiments, the mobile communication interface is operatively and selectively connected to the mobile processor 19, which is operatively and selectively connected to the mobile user interface, the mobile memory 18 and the positioning system device.

The mobile user interface, which may allow the mobile device 20 to receive data from the user 22, may include any of a number of devices allowing the mobile device 20 to receive data from the user 22, such as a keypad, keyboard, touch-screen, touchpad, microphone, mouse, joystick, stylus, other pointer device, button, soft key, and/or other input device(s). In some embodiments, the mobile user interface also includes one or more user output devices, such as a display and/or speaker, for presenting information to the user 22.

Each communication interface described herein generally includes hardware, and, in some instances, software, that enables a portion of the mobile device 20, such as the mobile processor 19, to transport, send, receive, and/or otherwise communicate information. For example, the mobile communication interface of the mobile device 20 may include a modem, server, electrical connection, and/or other electronic device that operatively connects the mobile device 20 to the central server 8.

Each processor 4, 7, 19 described herein, generally includes circuitry for implementing the audio, visual, and/or logic functions of that portion of the community loyalty application system. For example, the mobile processor 19 may include a digital signal processor device, a microprocessor device, and various analog-to-digital converters, digital-to-analog converters, and other support circuits. Control and signal processing functions of the device or server in which the processor resides may be allocated between these devices according to their respective capabilities. The processor 4, 7, 19 may also include functionality to operate one or more software programs based at least partially on computer-executable program code portions thereof, which may be stored, for example, in a memory device, such as the mobile memory 18 of the mobile device 20, the pharmacy memory 3 of the pharmacy server 2, and the central memory 6 of the central server 8.

Each memory device 3, 6, 18, described herein, including the mobile memory 18 for storing the mobile application 16 and other data and/or programs, may include any computer-readable medium. For example, memory may include volatile memory, such as volatile random access memory (RAM) having a cache area for the temporary storage of data. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system.

The mobile memory 18 of the mobile device 20 includes a mobile application 16. The mobile application 16 in some embodiments may be used by the user 22 to access over the network 12 a secure central server 8 to upload personal points data and download cumulative points data as described below. In some embodiments, the mobile application 16 includes computer-executable program code portions for instructing the mobile processor 19 to perform one or more of the functions of the mobile application 16 described and/or contemplated herein. In some embodiments, the mobile application 16 may be configured to a collect and transmit through the communication interface data regarding the user's 22 activities to enable the pharmacy to determine when one or more activities have been completed. In some embodiments, the mobile application 16 may include and/or use one or more network and/or system communication protocols.

Figure 15:
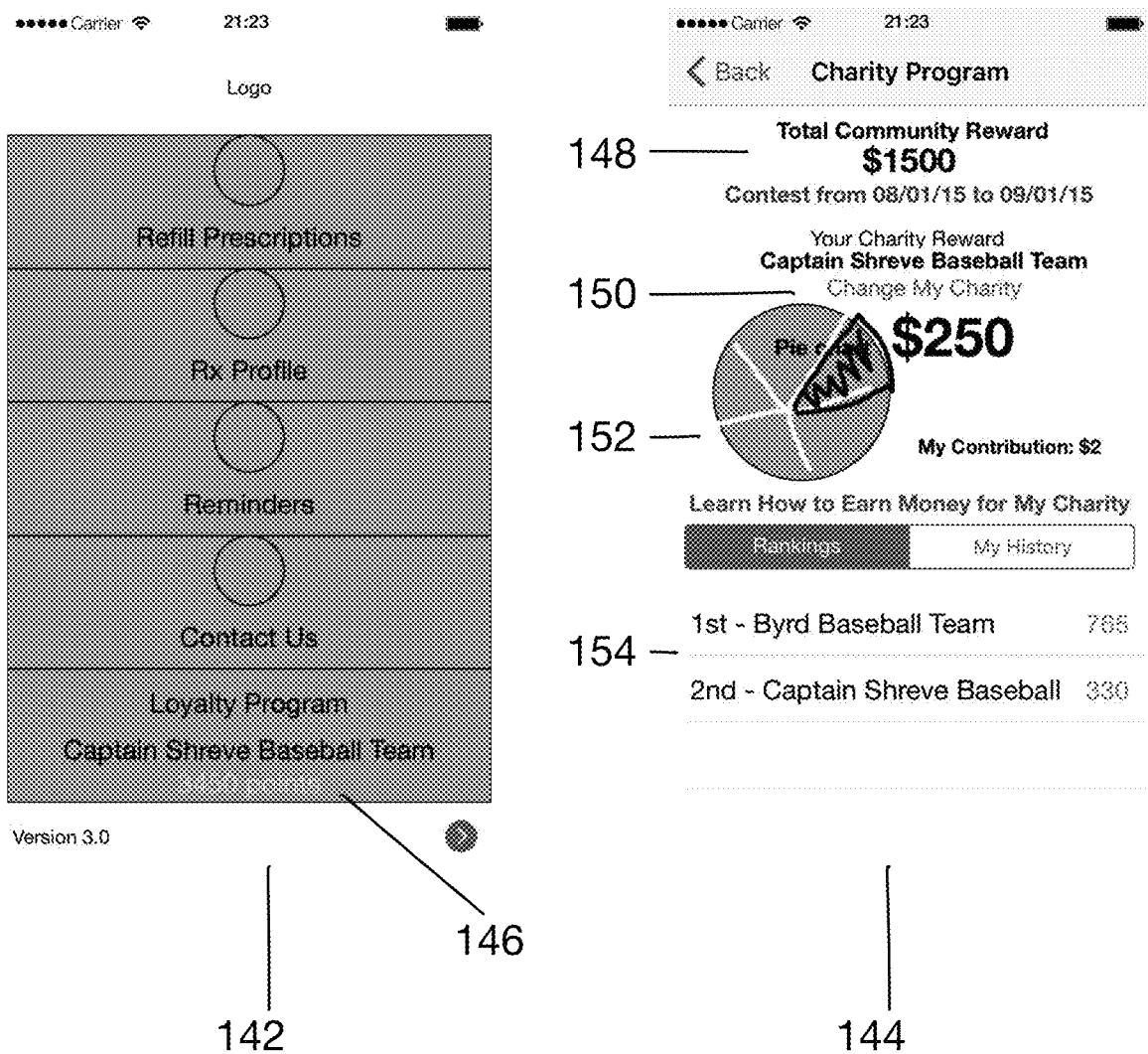

FIG. 15 shows an example mobile application 16 user interface. A user 22 interacts with the mobile device 20 and mobile application 16 as described in this document. A portion of the mobile application 16 will include an overview of the program and the status of the user 22, such as that shown on a main menu 142 screen. A user's 22 chosen organization and point values 146 are shown for quick reference. A detailed interface 144 can be shown and include information such as the total community reward 148 that the pharmacy has committed to the campaign, the user's 22 chosen organization and ability to edit that organization 150, diagrams or charts 152 and/or lists or grids 154 to visualize the current status of the campaign.

Website 14:

The community loyalty application system can include a user 22 and a user 22 web browser 14 accessing a website 15, a pharmacy server 2, a central server 8, and a network 12. It will be understood that the user 22 has access to the web browser 14 through a computing device 13.

The memory of the user's 22 computing device 13 will include the memory used by the web browser 14. Such memory will contain the information to represent the website 15 application on the computing device 13. The website 15 application in some embodiments may be used by the user 22 to access via the network 12 a secure central server 8 to upload personal points data and download cumulative points data as described below. In some embodiments, the website 15 application includes computer-executable program code portions for instructing the computing device's 13 processor to perform one or more of the functions of the website 15 application described and/or contemplated herein. In some embodiments, the website 15 application may be configured to collect and transmit through the communication interface data regarding the user's 22 activities to enable the pharmacy to determine when one or more activities have been completed. In some embodiments, the website 15 application may include and/or use one or more network and/or system communication protocols.

Pharmacy Server 2 and Central Server 8:

The pharmacy server 2 and the central server 8 currently disclosed may each include any computerized apparatus that can be configured to perform any one or more of the functions of the separate servers. It is to be understood that the machines referred to as server (pharmacy server 2 and central server 8) may be represented by computer platforms. In accordance with some embodiments, for example, the computer platforms may include an engine, a platform, a server, a database system, a front end system, a back end system, a personal computer system, and/or the like. In some embodiments, the computer platforms include a communication interface, a processor, and a memory. In some embodiments, user 22 data, such as point and or activity data, may be stored in pharmacy server memory 3 or central server memory 6 by way of a database system. The user 22 data will preferably have been previously collected and stored in the central memory 6 of the central server 8 and/or the pharmacy memory 3 of the pharmacy server 2 2/computer platform. The central or pharmacy communication interface is operatively and selectively connected to the respective central processor 7 or pharmacy processor 4, which is operatively and selectively connected to the respective central memory 6 or pharmacy memory 3. According to a further embodiment, the pharmacy server 2 function may be carried out largely by the central server 8 and the pharmacy not having a dedicated server locally. The pharmacy, according to this further embodiment communicates with the central server 8 via the network 12 and a web hosting site on the central server 8.

Figure 10:
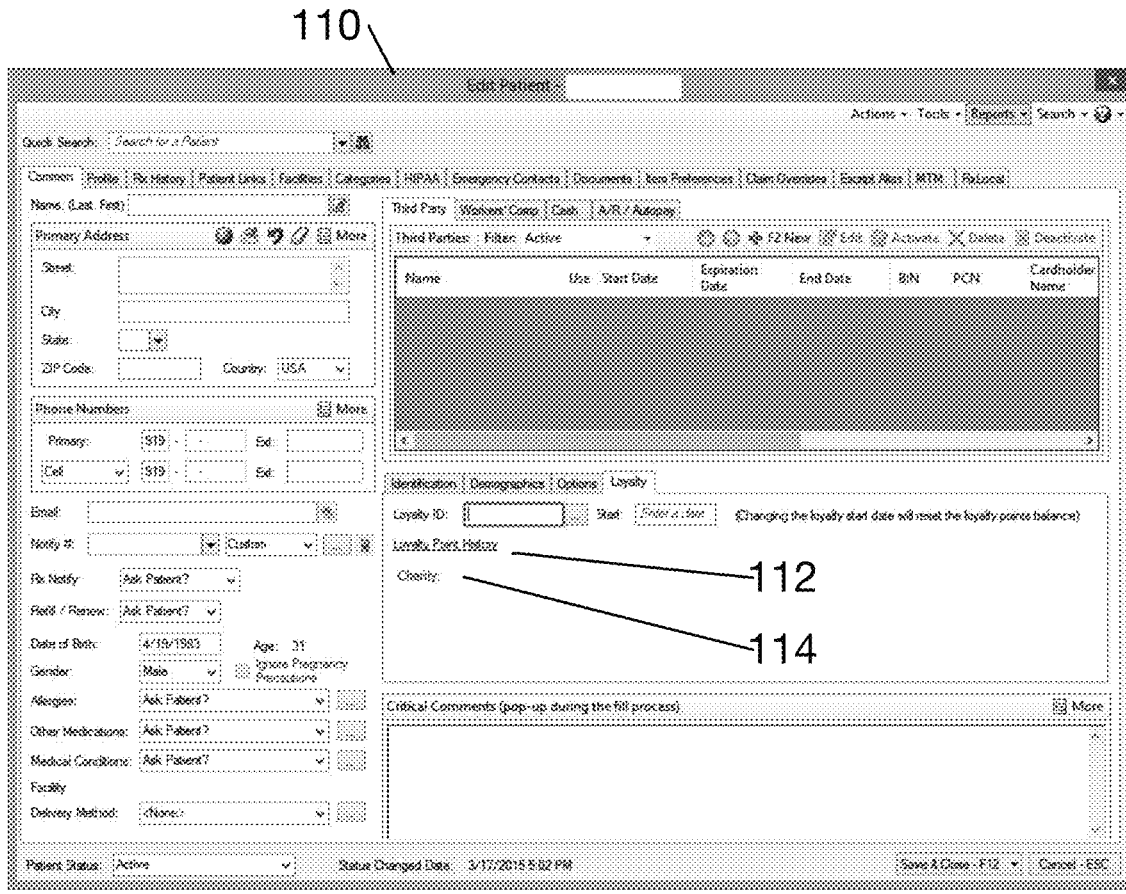
Figure 10:
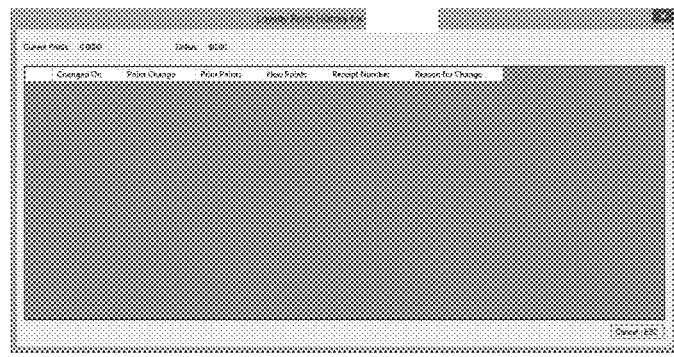
Figure 12:
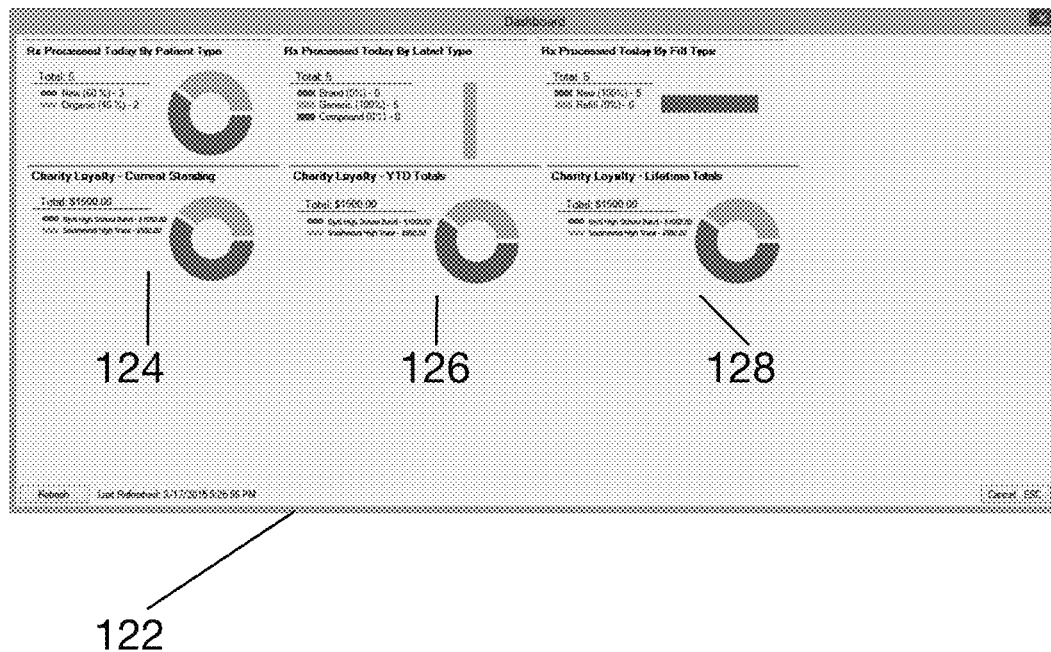

The Pharmacy server 2 will contain information and be able to present such information to pharmacy staff related to the status of the campaigns and patients' engagement. FIG. 12 shows a series of graphs where several examples 122 of how Charity Loyalty could be shown are present including current standing 124, year to date (YTD) totals 126, and lifetime totals 128. FIG. 10 shows an example interface to show Patient information 110 including Loyalty Point History 116 accessed through a link 112 along with a patient's chosen charity 114 if selected.

Health Related Activities.

The community loyalty mobile application 16 and/or website 15 application is stored in the mobile memory 18 on the mobile device 20 or user 22 computing device 13. When executed, it monitors the user 22 to detect if selected behaviors have occurred, and will award points for such behaviors. This monitoring can be automatic input, prompted for user 22 input, or non-prompted user 22 input. These behaviors will all be preferably health related behaviors, such that conducting the behaviors, in moderation, will directly or indirectly, on average, positively affect the health of the user 22. An example of some of the monitored health related behaviors are as follows. Walking minimum amount of distance/steps a day, which is positively correlated with better health. Other exercise, like yoga, swimming, jogging, bike riding, aerobics, weightlifting, and single or team sports may also be monitored. The amount of points for walking or other exercise may be tied to age and other health related factors.

Other health related activities include downloading the pharmacy's mobile application for prescription refills; using pharmacy's mobile application to order prescription refill; using pharmacy's mobile application or website to set up a reminder for the user 22 to take a prescription medication; taking a prescription medication; using pharmacy's mobile application to remind the user 22 to refill a prescription; picking up a filled prescription; receiving a vaccine at the pharmacy, including an annual flu vaccine, or a shingles vaccine; receiving other age/medically appropriate tests or treatments at the pharmacy, such as taking blood pressure, blood glucose monitoring, sleep monitoring, testing hemoglobin A1c, user 22 sending the pharmacy a lab report; the user's 22 doctor sending the pharmacy lab report; maintaining a target BMI, making a set amount of progress in attaining a target BMI, attaining a minimum amount of sleep, the user 22 taking his blood pressure; maintaining a blood pressure that is in a normal range; engaging in smoking cessation programs, and going each day or group of days without a cigarette or tobacco product.

Other health related activities include enrolling in a pharmacy refill synchronization program, referred to in the pharmacy industry as cycle fill and/or medication synchronization, the user 22 informing the pharmacy about the user 22 being discharged from a hospital, setting "emergency settings" on the mobile device 20, and enrolling/setting up the application, choosing a charity for a first campaign (even if the user 22 does not buy any medications from the pharmacy), referring other users 22 to download and setup the application, meeting stand goals and move calorie goals and other integration with other mobile device 20 applications, like "Health Kit", "Google Health", or "Fitbit", for example, maintaining a minimal adherence to maintenance medications at a level of, for example, greater than 75%, preferably greater than 78%, and most preferably greater than 80%, maintenance medications including blood pressure, hypertension and cholesterol medications; picking up filled medications from the pharmacy on time; consuming a minimal level of water intake, consuming a target amount of calories related to the health needs of the user 22; having minimal level of social interactions, including phone calls and texts, especially from a user 22 indicated selection of "close" contacts; and participating in an activity with a local charity or community group.

Other health related activities include being counseled by a pharmacy's pharmacist; setting health goals with the pharmacy; meeting goals set, conducting a comprehensive medication review (CMR) with a staff member or pharmacist at the pharmacy.

Points could potentially be deducted if the user 22 fails to conduct certain minimum activities, as, for example, failing to take a medication, including a maintenance medication, and failing to enter a lab.

The points earned in a given month or time period will preferably expire at the end of the month or time period.

Community Charities:

When the user 22 conducts a monitored activity during a given time frame, he earns points that are allotted to one or more of a selection of local charities. The local charities are chosen by the pharmacy and preferably all are local charities or community groups (hereinafter referred to simply as charities for ease). The locality of the charity will be within the service area of the pharmacy and/or be related to the interest of the customers of the pharmacy more than strictly a mile distance from the physical pharmacy. For example, a school band in the same city as the pharmacy may be considered a local group by the pharmacy's customs, but a symphony, opera, or museum in a larger neighboring city to the pharmacy's city may also be considered "local" to the pharmacy's customers, whereas a school band in the larger neighboring city would likely not be considered "local" to the pharmacy's customers. The charities are preferably local with a location that is local or proximate to the pharmacy's customers. The charities and community groups are preferably not national charities or organizations, especially not national organizations that have no local physical presence to the pharmacy.

Some of the benefits of the pharmacy aligning with local charities is that the pharmacy's customers will be more invested and connected to local charities, and the customers are more likely to personally know a member or beneficiary of the local charity, the stronger attachment of the local charity will allow greater goodwill to transfer to the pharmacy, and the local nature of both the charity and the pharmacy will underscore the difference between the local pharmacy and a similar local branch of a national pharmacy.

Examples of the local charities and community groups include school related groups, including elementary, middle, high, and college levels, including schools themselves, school bands, school athletic teams, school extra-curricular groups, Parent Teacher Organizations, and academic teams. Other local charities and community groups include civic non-profits, such as arts groups, like a local symphony, opera, museum, Lion's club, Rotary club, library, police and fire departments, and parks. Additionally, church related groups, or church drives and fundraisers could be included. The groups are preferably chosen by the pharmacy and a preferably geographically local, for example, with a physical location preferably within 20 miles of pharmacy, or with a minimum number or percentage, for example 10, 15, or 20 percent, of pharmacy customers or customers' family being a member, patron, or beneficiary of the group. Additionally, a minimum number of customers express interest in/vote on group participating, for example 10, 15, or 20 percent.

Figure 9:
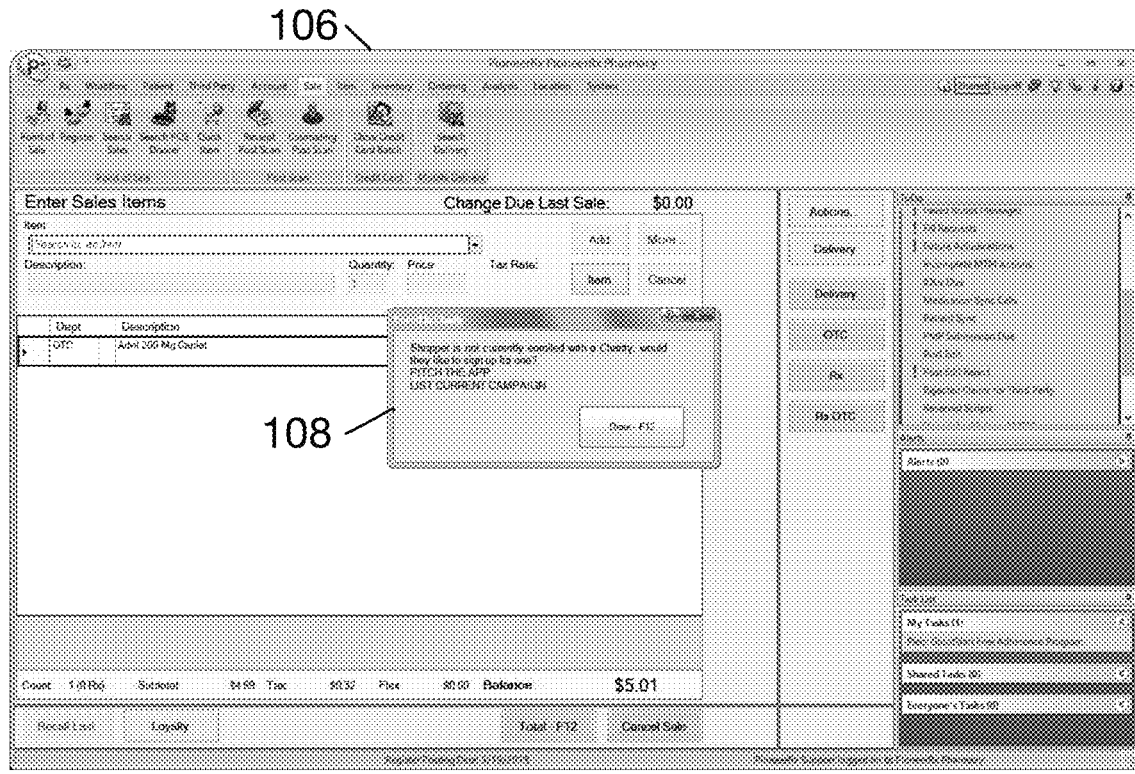
Figure 13:
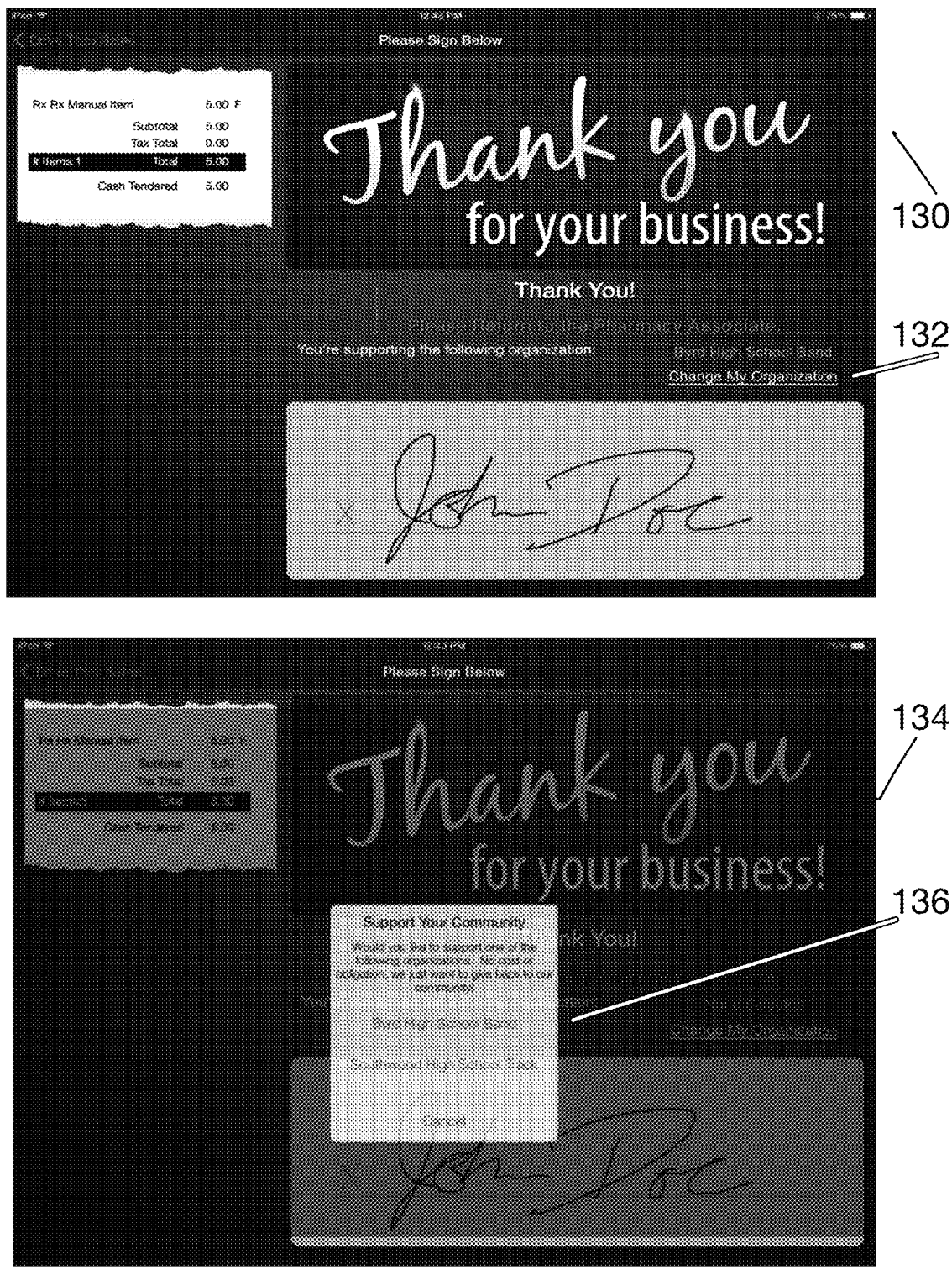
Figure 14:

At or around the beginning of a new campaign or if the user 22 initiates the mobile application 16 during the middle of a campaign, the mobile application 16 will present an option of charities to the user 22. The user 22 will select one or more charities to allocate his points to in a given month. The selection of charities will be preferably be changed each campaign/campaign time period. A user 22 can be prompted in various ways for their choice in charity, such as FIG. 9 where the user 22 is prompted 108 at a Point Of Sale (POS) system 106, FIG. 13 where a user 22 is prompted 136 on a Drive Thru Application 134 the user 22 is using in place of a traditional POS system and/or the user interface 130 includes an option to "Change My Organization" 132, and additionally FIG. 14 where a Delivery Application 138 can also prompt 140 for the user's 22 choice. Users 22 can be prompted only in the event they have not already chosen a charity, or additionally can change their charity if the campaign is still ongoing using options such as buttons 132 or 150.

Pharmacy Selecting Health Related Behaviors and Charities/Local Organizations in Program:

When a pharmacy elects to conduct a campaign, the pharmacy will need to choose an amount to award to the charity winner(s) of the campaign, the user 22 activities to reward, the charities to include, the manner in which the award is divided amongst charities, the timeframe for the campaign, and which, if any, sub-grouping of customers/users 22 will participate. Each of these items is preferably able to be changed for each new campaign. The application system will preferably present each of these options to the pharmacy when the pharmacy initiates a new campaign.

A variable first item presented to the pharmacy conducting the campaign will be the amount of the reward. The amount to reward will preferably be within the purview of the particular pharmacy. The award amount can vary from month to month or be consistent for one or more months. Total award amounts may range from US$100 to US$50,000, for example, and preferably range from US$500 to US$10,000, and most preferably range from US$1,000 and US$5,000.

When the pharmacy is choosing which behaviors to reward for a given campaign, the pharmacy will be presented with a list of options from the program and an option to choose a default selection of activities. The pharmacy may then select the activities it would like to include in the given campaign, and then either assign custom point values and time frames for the different activities (how often the user 22 may be rewarded for the activity—daily, weekly, etc.), or choose default point values and time frames for one or more or all of the activities.

Figure 3:
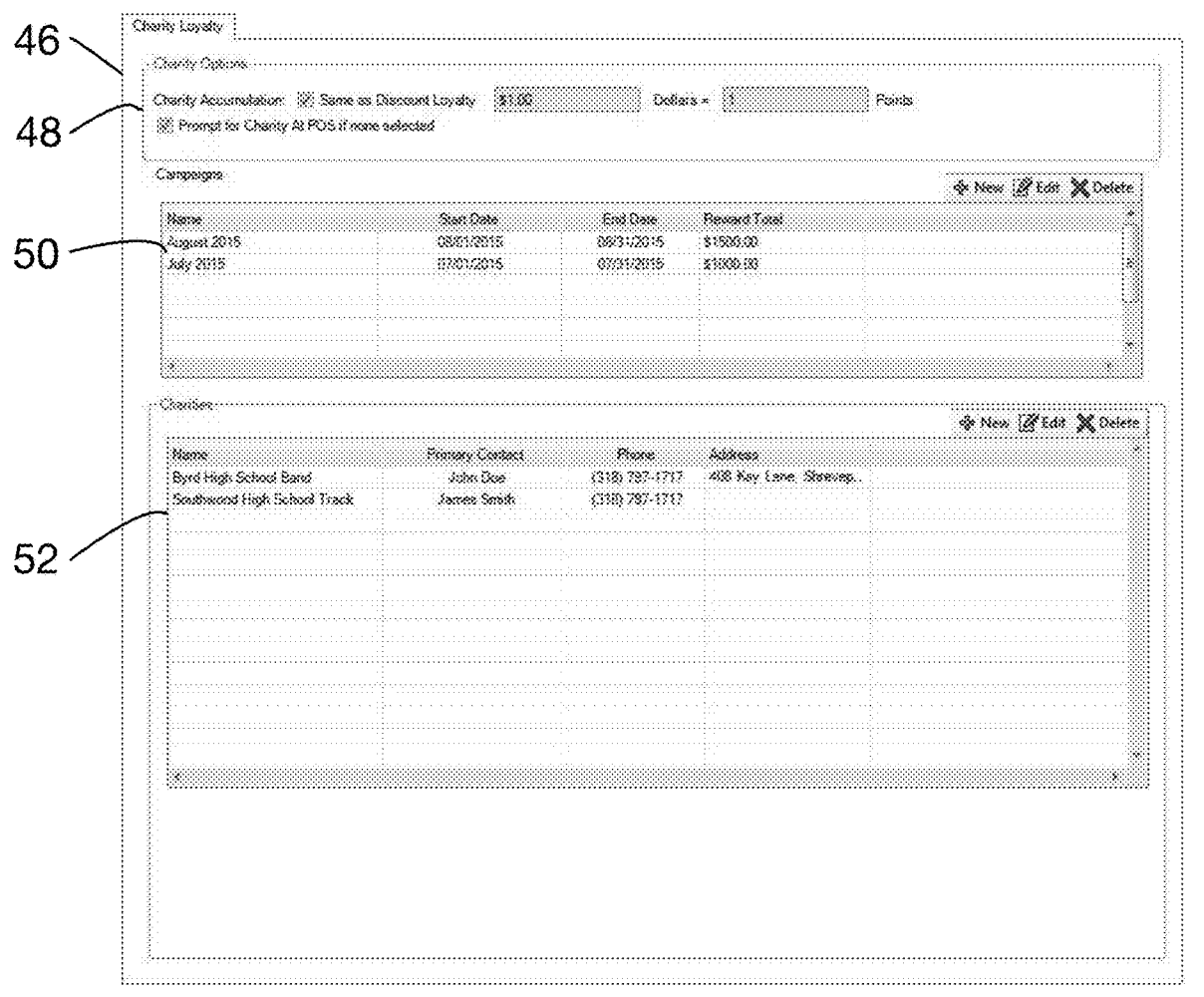
Figure 4:
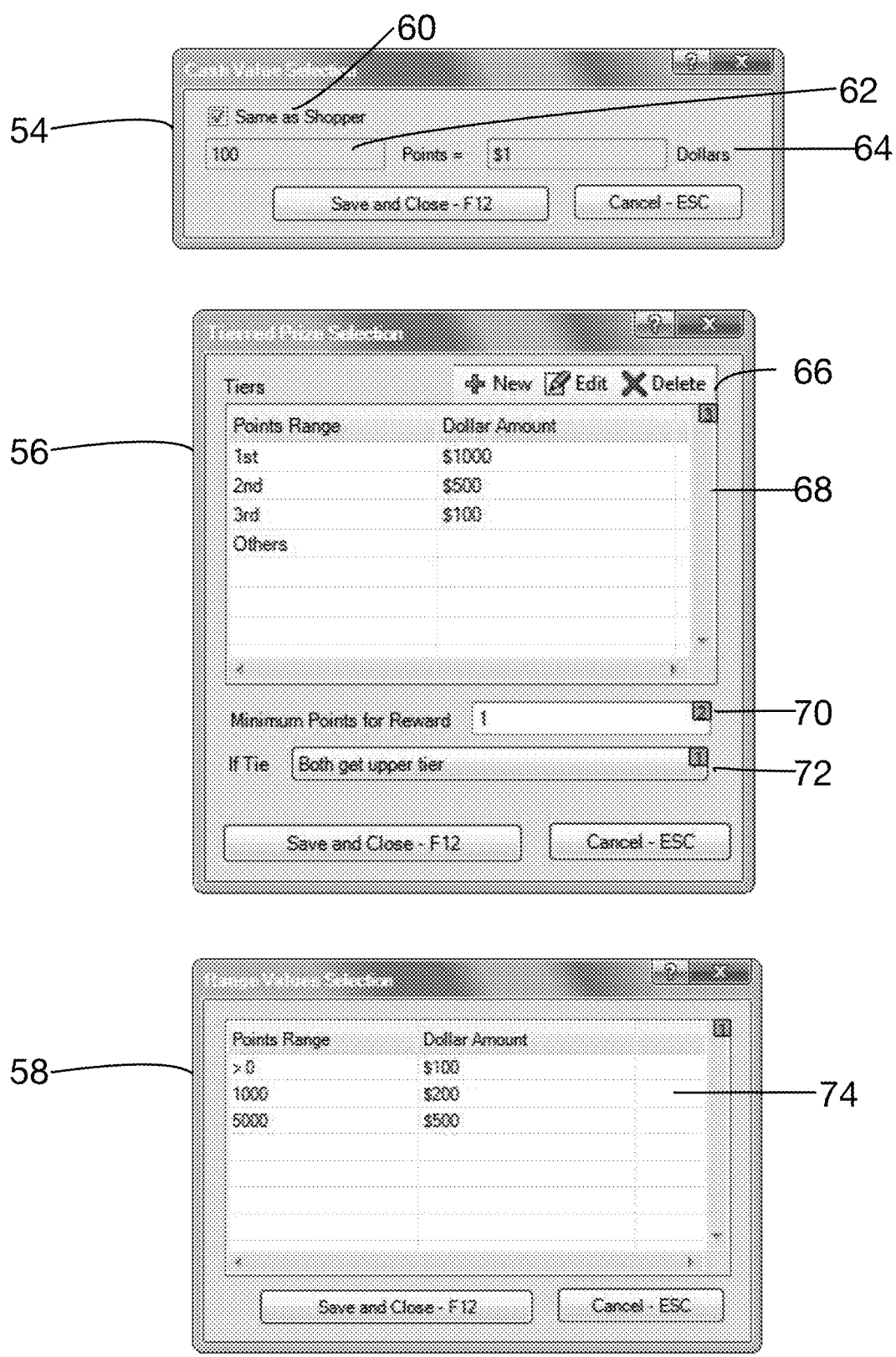

FIG. 3 shows an example interface 46 of how a pharmacy can allocate configurable options for their local community loyalty program. These options include how point should be allocated with options 48. FIG. 4 shows additional implementations of options 54, 56, 58. Other options can include, but are not limited to, Cash Value configuration 54, Tiered Prize configuration 56, or Range Value configuration 58. The pharmacy preferably chooses one configuration. Cash Value configuration 54 consists of a certain number of points 62 converting to a certain amount of money 64. Since this configuration is similar in nature to traditional loyalty reward programs, a system may choose to use those settings 60 instead of discrete ones for community points. Tiered Prizes 56 consists of one or more ranges of money to award. At the end of a campaign, charities will be ranked by the total number of points each has accumulated and be awarded based on the tiers set in this interface 68. A tier editing interface 66 can provide abilities to create new tiers, edit existing tiers, or delete tiers as desired by a pharmacy. An optional minimum points 70 needed to receive a reward can also be set. Also options for cases when ties occur can be set 72. Range Selection 58 consists of setting ranges based on the number of points accumulated in a campaign. For each charity, they will be awarded the amount corresponding to the points they have collected based on the settings 74.

Figure 7:
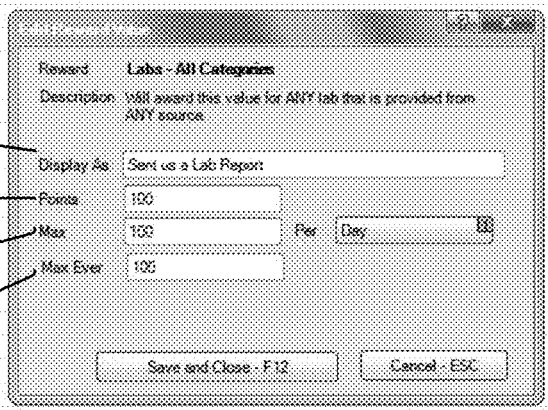

FIG. 7 shows other configuration options for how points are awarded to different activities 89. A listing of activities 90 is shown and editable by the pharmacy. Each supported activity can have a display name 92, a value for the number of points to award 94, a maximum number of points per period 96, such as minute, hour, day, week, month. A maximum number of points for a patient's lifetime can also be set 98.

Figure 8:
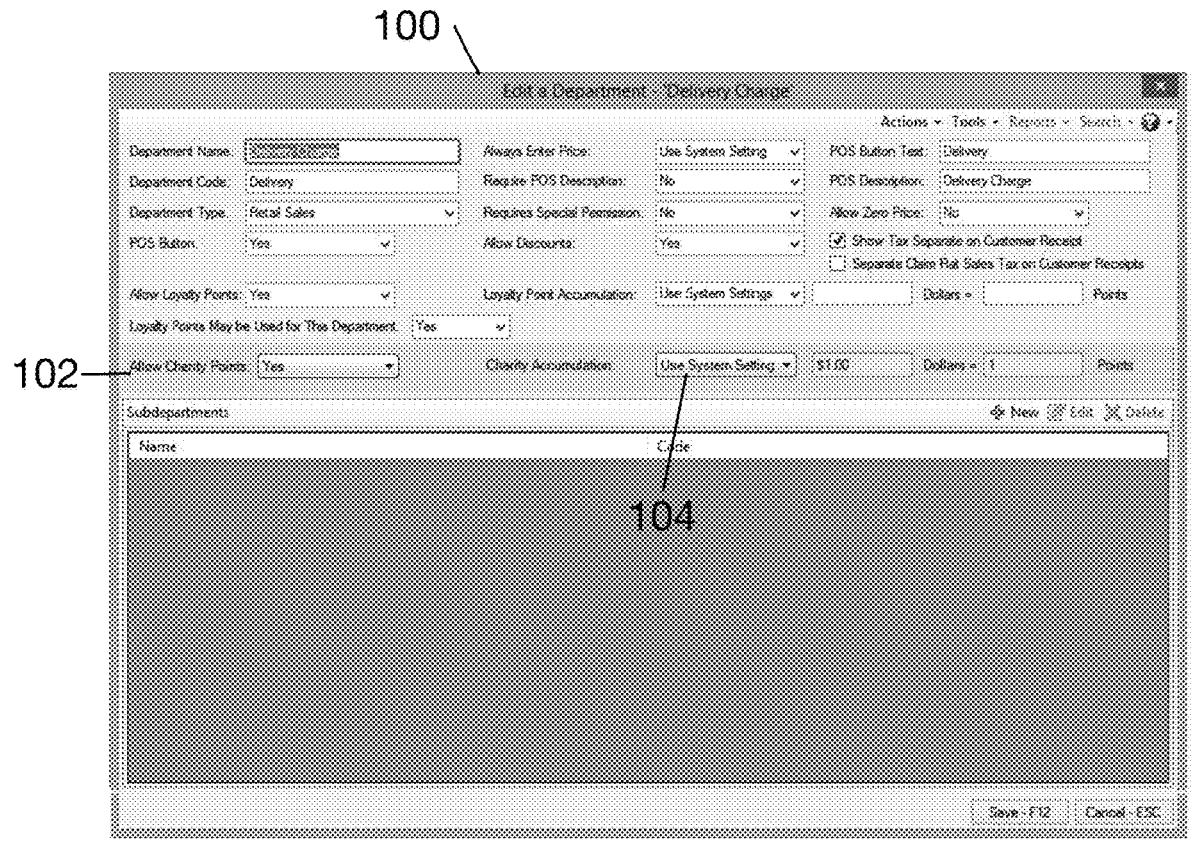

Additional, in FIG. 8 an interface 100 can be used to represent settings for a department in a pharmacy for certain drugs, over-the-counter (OTC), or even retail items that are sold or provided to a patient. These can have points allowed to them by selecting an option 102 to enable them. Additional options 104 can be used to configure the value of points, or keep a system level setting for items.

Next, the pharmacy will choose and input which charities to include in the campaign. The charities may be entered separately and stored on the pharmacy server 2, or the pharmacy could enter the charity while setting up the campaign the charity will be participating in.

Next, the pharmacy will indicate and input the manner in which the prize money or other items of value will be distributed. As discussed further below, options include, allocating prize money based on percentage of points received, awarding set proportions for point rankings, and guaranteeing minimal amounts for all participants, among others.

Next, the pharmacy will choose the time frame or duration of the campaign. It is anticipated that the campaigns will have a monthly or quarterly duration, as this is a common amount of time that pharmacies set aside for advertising budgets. Other time durations may also be possible, including lengths of one day, multiple days, one week, two weeks, multiple months, and one year, for example.

Next, the pharmacy may choose which, if any, sub-grouping of customers/users 22 will participate. It may be that a pharmacy will want to run two campaigns at the same time, one for users 22 50 and over, and one for users 22 49 and under. Alternatively, the pharmacy may run one campaign for users 22 living in one political or geographic area of service (e.g., east of the pharmacy or in a first town/neighborhood) and a second concurrent campaign for users 22 living in a second geographic area (e.g., west of the pharmacy or in a second town/neighborhood).

Figure 11:
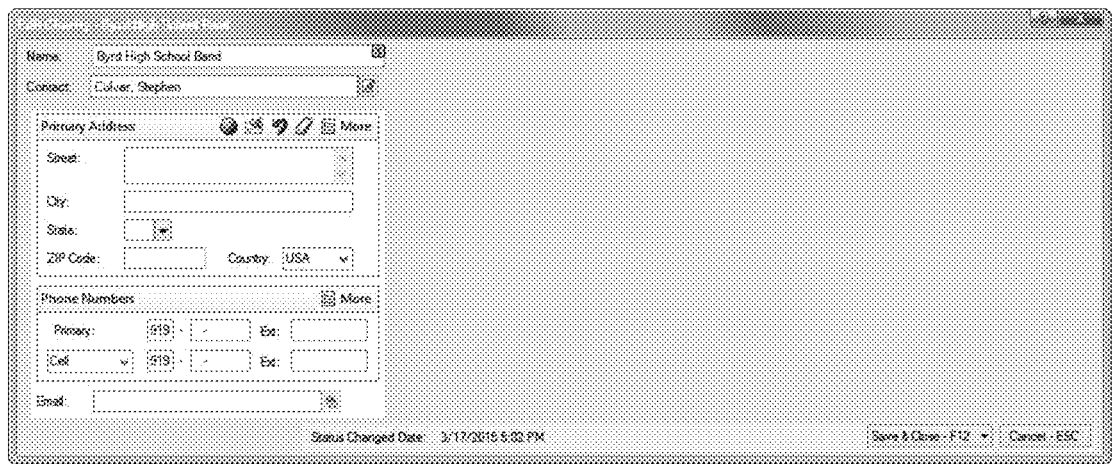

FIG. 3 shows the list of campaigns 50 and list of charities 52 the pharmacy has setup. FIG. 11 additional shows an interface where the charity is configured 120. This configuration can include but is not limited to name, contact, address, phone and email.

Once the pharmacy has chosen all of the variables relating to the campaign, the pharmacy selects the option to begin the campaign, and the data is transmitted or pushed to the central server 8. The mobile device 20, when querying the central server 8, will pull the campaign data down. The variables relating to the campaign may be transmitted from the pharmacy server 2 to the central server 8, and from there to the mobile device 20, well in advance to the start of the campaign. This allows users 22 to learn ahead of time and choose which one of a number of charities will be competing in an upcoming campaign.

Preferably, all of the pharmacy server's 2 communication with the central server 8 is started by the pharmacy server 2. Additionally, preferably all of the mobile device's 20 communication with the central server 8 is started by the mobile device 20.

Tracking Health Related Behaviors:

There are multiple methods and devices that may be used to monitor and input data regarding health related activities into the mobile device 20 or website 15 application. Different APIs for different other mobile applications can be used to aid in tracking health related activities and facilitate inputs of status (e.g., weight, blood pressure) and data into the community loyalty application. Activities may be manually tracked, where the health related activities are manually inputted into the mobile device 20, either in response to a prompt, or are manually initiated without a prompt. The manual input can be through a touch screen interaction or through a voice interaction, or both, for example.

Preferably, for ease of use, an automatic tracking is available for many or most inputs. The automatic tracking can be through the mobile device 20, using the mobile device's 20 touch screen, GPS, motion detection, sound detection, altimeter, preferably 3 axis accelerometer, call and text logging, calendar, email, and other functionality to track health related activities. Additionally, the health related activities may be tracked through external devices, like a Fitbit type of device, that are external to the mobile device 20 and communicate wired or wirelessly (via, for example, Bluetooth or Wi-Fi) with the mobile device 20. OS level interface may also be incorporated. Automatic tracking may be authorized by accessing mobile device 20 and operating system (OS) APIs such as Apple's HealthKit, Google Health, or other services, for example.

Figure 5:
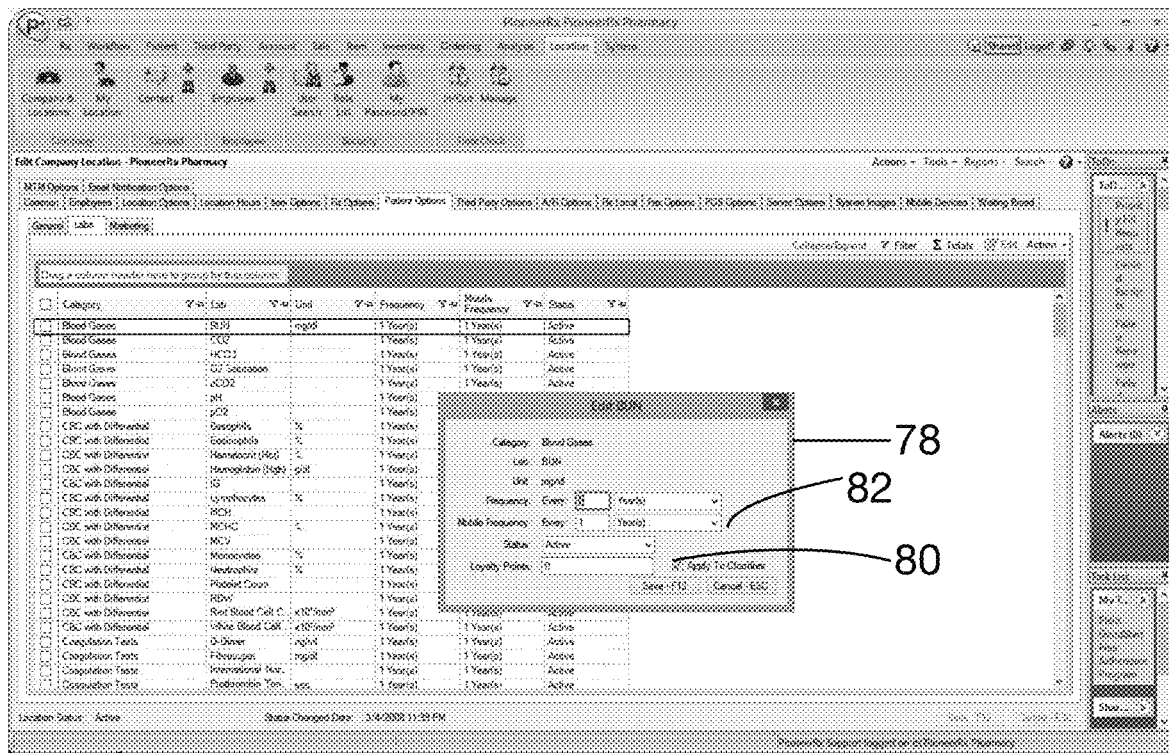
Figure 6:
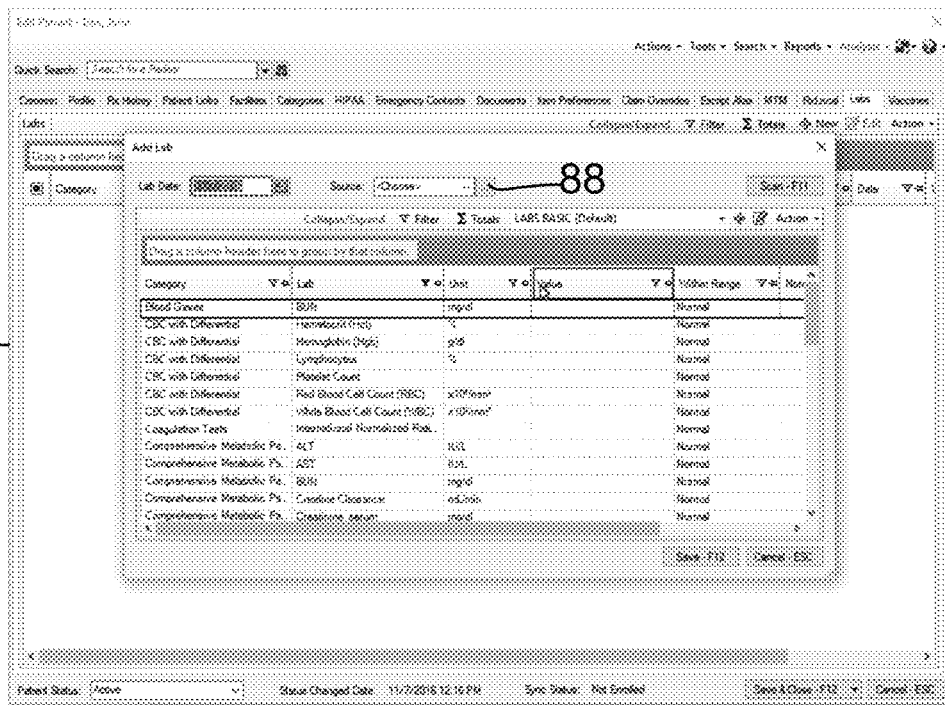
Figure 6:
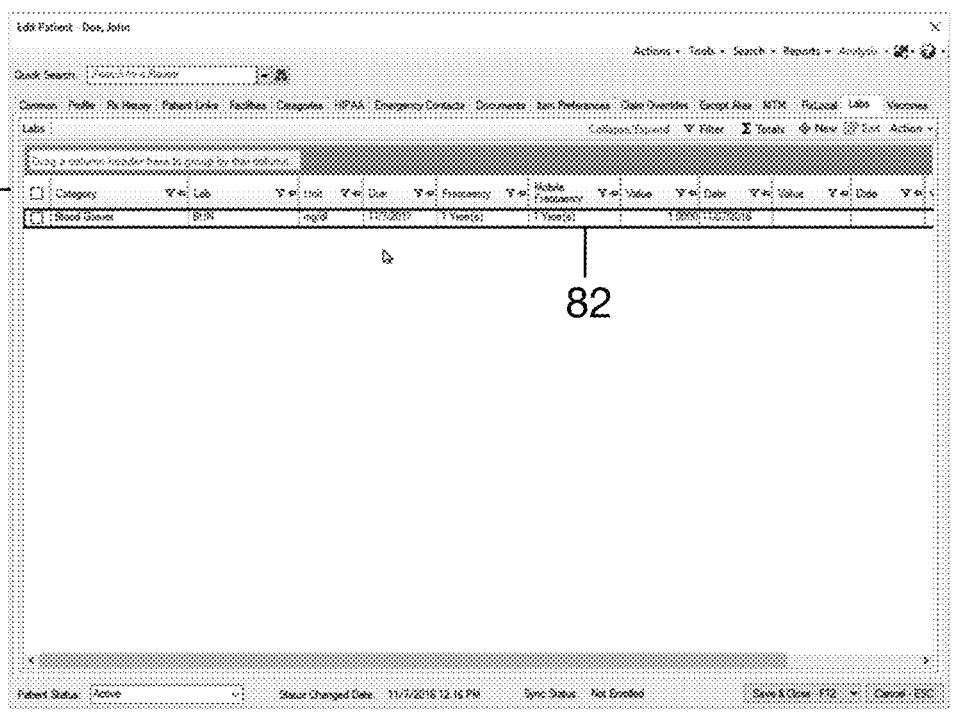

FIGS. 5 and 6 show some of the labs patients can monitor. In FIG. 5, a pharmacy can configure how labs work in their system, including how it interacts with the community loyalty application. A lab management user interface 76 is provided to the pharmacy. When editing a lab's configuration 78, the pharmacy can select how many loyalty points this lab is worth and if it applies to the community charities 80. There can also be options that allow the user 22 to be prompted on their mobile devices 20 for labs at certain intervals 82, also shown on FIG. 6. FIG. 6 shows an example interface for lab results 84 for patients in the pharmacy system. This information can come from pharmacy manual entry, patient manual entry into the mobile application 16 or website 15, or patient automatic entry from the mobile application 16 or website 15. A source 88 can be set for the results to indicate where they were obtained. Those entered by a patient manually or automatically collected from the application will be set automatically so that the pharmacy understands the source of the information. A completed lab entry will appear in the user interface as shown 86.

Awarding Points for Health Related Behaviors:

The user 22 will be awarded points for conducting monitored activities during a given time frame. The time frame can be different for different activities. For example, the user 22 can be rewarded each day for taking prescribed medication (a day long time frame), but only awarded once a year for receiving a flu vaccination. If, for example, a user 22 took his blood pressure twice in one day, and taking blood pressure was allotted to be rewarded on a daily time frame, the user 22 would not receive any extra points for taking the second blood pressure reading in the day. Other activities can be rewarded on a daily, weekly, bi-weekly, monthly, quarterly, and annual basis. Some activities may only be awarded one time only, like, for example, downloading the mobile application 16 and signing up with the community loyalty application system. There would preferably be different point levels rewarded for at least some different activities. Preferably, the activities that would have the greatest benefit to the user's 22 health would receive the highest points. Additionally, activities which facilitate or increase the user's 22 participation in the community loyalty application system—for example, downloading and initiating the mobile application 16 system is necessary for the user 22 to participate with the community loyalty application system, and thus may receive a high relative amount of points.

To the extent possible, the point awards should be simplified and easily understandable, so that they will have the greatest incentive effect. Preferably, decimal and fractional points will be avoided. Preferably, the points awarded in increments of $10^n$ points, where n is a non-negative integer, but may also be in the form of $n10^n$ points, where n is again a non-negative integer. The points for a specific activity may vary month to month, or other some other time period, to try and incentivize different health related activities, and may vary for one age groups or other segment of users 22 and not for another. Points for activities that are rewarded daily are preferably smaller in number than those that are rewarded weekly or monthly or yearly. The points awarded for downloading and initiating the mobile loyalty application would preferably be very high. Some points may be awarded as bonus points for consistently conducting activities that may have already received points. For example, walking a minimum number of steps on a given day may be rewarded with a set number of points, but it the user 22 walks a minimum number of steps for seven, fourteen, and thirty days in a row, for example, the user 22 may receive additional points on top of the initial points rewarded. The more difficult the activities are to achieve, such as long term consistently meeting daily walking goals, preferably the more points to be awarded.

Preferably, a substantial number of monitored activities, and more preferably a majority of monitored activities will not require the user 22 to purchase medication from the pharmacy to receive points. According to one embodiment, no monitored activity for which points are awarded will require the user 22 to purchase medication from the pharmacy.

Communicating Health Related Behaviors to Pharmacy:

Mobile device 20 uploads point and/or activity data to central server 8 over the network 12, internet or cellular data communicating with the central server 8 by pushing data up to central server 8. Pharmacy's server 2 would periodically query the central server 8 over the network 12. Pharmacy is preferably not allowed to be accessed from internet, with preferably no ports of the pharmacy server 2 listening for incoming traffic. The pharmacy server 2 preferably does not host a web server. The pharmacy's server 2 can preferably only call out for data. The mobile device 20 pushes data to central server 8, which holds and/or processes the data. The pharmacy's server 2 periodically queries central server 8 for new data that central server 8 has for pharmacy server 2. The pharmacy server 2 pulls user 22 point and/or activity data from the central server 8 and pushes campaign and/or current state/status data to the central server 8. The current state of the program is preferably held at the central server 8, but could also or alternatively be held at the pharmacy server 2. The mobile device 20 pulls current state data from the central server 8 to the mobile device 20.

The status data that the central server 8 sends to the mobile device 20 will include the point status of the various charities in a current campaign. The mobile application 16 will preferably cause the user's 22 mobile device 20 display screen to display a visual indicia of the current point status data of the user's 22 chosen charity, especially with relation to the current point status data of the one or more other charities that the user's 22 chosen charity is competing against in the current campaign. The visual indicia of status can be in a dashboard format and/or in a chart, table, graph and/or numeric nature. In one embodiment, a pie type chart will be presented that will display the point status data all of the competing charities in a given campaign, with their respective points represented as area on the pie chart.

Choosing a Winner:

For each campaign/contest in a given campaign period, the pharmacy will preferably award a total of prizes derived from set amount of money or other items of value for a given campaign and campaign period. The amount awarded will preferably be independent of the total amount of users 22 participating and the total amount of points accumulated. The prize allocation among the multiple charities participating will preferably be substantially proportional to the number of points the competing charities received in the campaign period. For example, according to one embodiment, if there was a total of 10,000 dollars to be distributed for one campaign in a single campaign period, and charity A received 80,000 points, charity B received 15,000 points, and charity C received 5,000 points, charity A, receiving 80% of the total points awarded during the campaign period will receive 80% of the total prize money, or $8,000. Charity B, receiving 15% of the total points awarded during the campaign period will receive 15% of the total prize money, or $1,500. Charity C, receiving 5% of the total points awarded during the campaign period will receive 5% of the total prize money, or $500.

Alternatively, the charity receiving the largest number of points could receive a disproportionate amount of the total prize money, including the entire amount (i.e., winner take all).

Also, the charities could receive a set amount of prize money based on ranking of point total. Just for example the charity having the highest point total could receive 50% of the prize money. The charity having the second highest point total could receive 35% of the prize money. The charity having the third highest point total could receive 15% of the prize money. Thus, in this embodiment, with the point totals for Charities A, B, and C above, charity A having the highest point total would receive $5,000, charity B having the second highest point total would receive $3,500, and charity C having the third highest point total would receive $1,500.

Additionally, a provision could be made that each charity competing in the campaign receives a minimum prize amount, so that even if a charity receives no or relatively very few points, the charity would receive a prize.

The pharmacy could require a minimum number of points for any charity in a campaign to be awarded funds, and if no charity receives a point total that exceeds the minimum, no funds would be awarded.

The pharmacy could similarly require a minimum number of points to begin a campaign, and once one, or all, of the charities in a campaign have points over a specified amount, the campaign would start.

Additionally, though most embodiments envision the passing of a set amount of time as the requirement to end a campaign (running for a fixed length of time), the campaigns can also be run as a race to a certain point level. In such an embodiment, for example, the campaign would end as soon as one, or all of the charities attained a minimum number of points.

Other variations include awarding a bonus or mini award for first charity to exceed a set minimum number of points in campaign. Additionally, the prize could be awarded based on highest number of users 22 having a minimum number of points.

Also, there could be multiple reward levels for charities receiving different levels of points.

Further there could be multiple rewards for different subgroups of customers, based on, for example, age and geography.

Additionally, there may be multiple overlapping campaigns with staggered beginning and ending dates. In such an embodiment, multiple themed campaigns may be conducted, which may appeal to different sub-groups of customers/users 22, without increasing the frequency of awards and without forcing a group of users 22 to feel left out. For example, a High School Band campaign may begin on January 1 and last until February 28, and a second High Culture campaign may begin on February 1 and last until March 31, giving multiple groups of users 22 distinct charities/themes to contribute too, without increasing or decreasing the amount of prize money awarded or the frequency that the prize money is awarded.

Some or all of the groups can remain constant from month to month or other time period, but most or all of the groups will preferably change from one month to the next. This will increase the perceived scarcity of the awards and will also increase the interest of the users 22 and of participating groups in a given month.

It is anticipated that there will be themed months, such as "High School Band" month, or "Civic Organizations Month," or "Soup Kitchen" month, where groups sharing the common theme will compete against one another for the monthly prize.

Based on current clinical research to the separate elements of the system, there are significant health benefits to the users 22 for participation in the disclosed system with the following list just an example of the various benefits, with the system providing increased motivation for increased participation in the system and thus increased health benefits.

First, by tracking and rewarding medication adherence, medication adherence will increase, decreasing morbidity and mortality from a plurality of diseases and conditions which the user 22 has prescribed medication to treat. Additionally, increased medication adherence helps reduce the current medication non-adherence costs of up to $300 billion in avoidable medical spending.

Second, by tracking and rewarding increased moderate exercise, moderate exercise will increase, which be boosts high-density lipoprotein (HDL), or "good," cholesterol and decreases unhealthy triglycerides, which keeps blood flowing smoothly, which decreases your risk of cardiovascular diseases. Exercise also helps prevent or manage a wide range of health problems and concerns, including stroke, metabolic syndrome, type 2 diabetes, depression, certain types of cancer, arthritis and falls. Further, physical activity stimulates various brain chemicals that boosts mood and may leave an individual feeling happier and more relaxed. Also, individuals may also feel better about their appearance and their self when exercising regularly, which can boost confidence and improve self-esteem.

Third, by tracking and rewarding increased social engagement and interaction, social engagement and interaction with the others and the community increases. Specific health benefits of social interaction, especially in older adults include potentially reduced risk for cardiovascular problems, some cancers, osteoporosis, and rheumatoid arthritis, potentially reduced risk for Alzheimer's disease, lower blood pressure, and reduced risk for mental health issues such as depression. Conversely, social isolation carries real risks, which the program helps prevent. Some of these risks are feeling lonely and depressed, being less physically active, having high blood pressure, and having a greater risk of death Fourth, tracking any charity involvement, and providing the user 22 a means of helping to fund a chosen charity, increases charity involvement and an increased feeling of making a difference, being empowered, and having control over the individual's situation in life, leading to better overall physical and mental health, including reduction in stress and blood pressure.

While various embodiments of the present invention have been described in detail, it is apparent that various modifications and alterations of those embodiments will occur to and be readily apparent those skilled in the art. However, it is to be expressly understood that such modifications and alterations are within the scope and spirit of the present invention, as set forth in the appended claims. Further, the invention(s) described herein is capable of other embodiments and of being practiced or of being carried out in various other related ways. In addition, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items while only the terms "consisting of" and "consisting only of" are to be construed in the limitative sense.

Wherefore, We claim:

1. A community loyalty rewards system comprising:
   a mobile device;
   a central server; and
   a pharmacy server;
   wherein
      the mobile device has instructions stored on a mobile device memory, the instructions when executed by a processor of the mobile device causes the mobile device processor to
         (a) track health related activities, wherein the health related activities include (i) enrolling in a pharmacy mobile application (ii) being counseled by a pharmacy pharmacist and (iii) refiling a single prescription;
         (b) determine if a user participated in any of the health related activities;
         allocate points to the user for the health related activities, wherein more than ten times as many points are allocated to the user either for the user enrolling in the pharmacy mobile application or for the user being counseled by the pharmacy pharmacist than points allocated to the user for refiling a single prescription; and
         (d) push user point data to the central server and pull user status data from the central server;
      the pharmacy server has instructions stored on a pharmacy server memory that causes a pharmacy server processor to
         (a) push campaign data to the central server;
         (b) pull the user point data and the user status data from the central server; and
         (c) initiate all transfer of the user point data and the user status data between the pharmacy server and the central server;
      the mobile device is prevented from both pushing the user point data directly to the pharmacy server and pulling the user status data directly from the pharmacy server; and
      one of the pharmacy server processor and a central server processor determine a charity that receives the points;
   whereby the user is incentivized to participate in increased health related activities; and
   the health related activities include at least one health related activity from two or more of user health related exercise activities, user health related pharmacy mobile application usage, user health related pharmaceutical usage activities; user participation in pharmacy healthcare delivery, user health monitoring activities, and user health maintenance or improvement.

2. The system of claim 1 wherein the mobile device further comprises instructions stored on the mobile device memory that causes the mobile device processor to automatically track the health related activities and receive points for such automatically tracked health related activities.

3. A community loyalty rewards system comprising:
   a computing device;
   a central server; and
   a pharmacy server;
   wherein
      the computing device has instructions stored on a computing device memory, the instructions when executed by a processor of the computing device causes the computing device processor to (a) track health related activities, wherein the health related activities include (i) enrolling in a pharmacy mobile application (ii) being counseled by a pharmacy pharmacist and (iii) refiling a single prescription;
(b) determine if a user participated in any of the health related activities:
(c) allocate points to the user for the health related activities, wherein more than ten times as many points are allocated to the user either for the user enrolling in the pharmacy mobile application or for the user being counseled by the pharmacy pharmacist than points allocated to the user for refiling a single prescription; and
(d) push user point data to the central server and pull user status data from the central server;
the pharmacy server has instructions stored in a pharmacy server memory that cause a pharmacy server processor to
push campaign data to the central server;
(b) pull the user point data and the user status data from the central server; and
(c) initiate all transfer of the user point data and the user status data between the pharmacy server and the central server;
the computing device is prevented from both pushing the user point data directly to the pharmacy server and pulling the user status data directly from the pharmacy server; and
one of the pharmacy server processor and a central server processor determine one or more charities that have won based on a point system;
whereby the user is incentivized to participate in increased health related activities; and
the health related activities include at least one health related activity from at least three of user health related exercise activities, user health related pharmacy mobile application usage, user health related pharmaceutical usage activities; user participation in pharmacy healthcare delivery, user health monitoring activities, and user health maintenance or improvement.

4. The system of claim 1 wherein the mobile device memory further comprises instructions for the mobile device processor to assign a dollar amount to a given charity based on a number of points per a number of dollars spent by users who are customers of the pharmacy.

5. The system of claim 3 wherein browser memory further comprises instructions for the computing device processor to assign a dollar amount to a given charity based on a number of points per a number of dollars spent by users who are customers of the pharmacy.

6. The system of claim 1 wherein the mobile device memory further comprises instructions for the mobile device processor to assign a dollar amount to a first charity based on a ranking of the first charity in comparison to a total number of points collected compared to other charities.

7. The system of claim 3 wherein browser memory further comprises instructions for the computing device processor to assign a dollar amount to a first charity based on a ranking of the first charity in comparison to a total number of points collected compared to other charities.

8. The system of claim 1 wherein the mobile device memory further comprises instructions for the mobile device processor to assign a dollar amount to a first charity based on a number of points in a range of values, and the health related activities include at least one health related activity from each group of user health related exercise activities, user health related pharmacy mobile application usage, user health related pharmaceutical usage activities; user participation in pharmacy healthcare delivery, user health monitoring activities, and user health maintenance or improvement.

9. The system of claim 3 wherein browser memory further comprises instructions for the computing device processor to assign a dollar amount to a first charity based on a number of points in range of values.

10. A method for incentivizing participation in health activities for a user, using a system comprising a central server; a pharmacy server, and one of a mobile device and a computing device, the method comprising:
interacting with the system to record a user's health related activities;
preventing the one of a mobile device and a computing device from directly communicating the user's health related activities data to the pharmacy server;
tracking health related activities, wherein the health related activities include (i) enrolling in a pharmacy mobile application (ii) being counseled by a pharmacy pharmacist and (iii) refiling a single prescription;
determining if a user participated in any of the health related activities;
allocating points to the user for the health related activities, wherein more than ten times as many points are allocated to the user either for the user enrolling in the pharmacy mobile application or for the user being counseled by the pharmacy pharmacist than points allocated to the user for refiling a single prescription;
assigning the allocated points to one of a group, charity, and organization of a plurality of one of groups, charities, and organizations;
determining one or more winners from the plurality of one of groups, charities, and organizations; and
giving a financial award to the one or more winners;
wherein the pharmacy server initiates all transfer of user data between the pharmacy server and the central server,
wherein the health related activities include at least one health related activity from four or more of user health related exercise activities, user health related pharmacy mobile application usage, user health related pharmaceutical usage activities; user participation in pharmacy healthcare delivery, user health monitoring activities, and user health maintenance or improvement.

11. The method of claim 10 wherein the mobile device automatically allocates points based on health related interactions that are captured by the device.

12. The method of claim 10 wherein the mobile device automatically allocates points based on information shared from other electronic devices, and the other electronic devices interfacing in a mobile device memory.

13. The system of claim 1 wherein the mobile device memory further comprises instructions for the mobile device processor to cause a user interface to display to a user a status of the system, a point values and totals, and a status of groups, charities, or organizations to which points are allocated.

14. The system of claim 3 wherein browser memory further comprises instructions for the computing device processor to cause a user interface to display to a user a status of the system, a point values and totals, and a status of groups, charities, or organizations to which points are allocated.

15. The system of claim 1 further comprising a pharmacy computing device, the pharmacy computing device configured to present a set of user interfaces to alter, by a pharmacy,
how points are awarded for activities;
how points are awarded to one of groups, charities, and organizations;
what one of the groups, the charities, and the organizations are available; and
campaign options such as an amount of money to award and one or more time frames related to a campaign.

16. The system of claim 3 further comprising a pharmacy computing device, the pharmacy computing device configured to present a set of user interfaces to alter, by a pharmacy,
how points are awarded for activities;
how points are awarded to one of groups, charities, and organizations;
what one of the groups, the charities, and the organizations are available; and
campaign options such as an amount of money to award and one or more time frames related to a campaign.

17. The method of claim 12 further comprising the steps of:
collecting information on a central server,
transmitting the information from the central server to the pharmacy server; and
incorporating the information into pharmacy software for use in management and patient care.

18. The method of claim 12 further comprising the steps of:
transmitting information from the pharmacy server to the central server;
transmitting the information from the central server to the one of the mobile device and the computing device for users to view status and updates.

19. The system of claim 1 wherein
(a) the central server acts as a conduit for all data between the mobile device and the pharmacy server,
(b) user health related exercise activities includes one of
walking a minimum amount of distance/steps a day;
yoga;
swimming;
jogging;
bike riding;
aerobics;
weightlifting; and
single or team sports;
where an amount of points allotted for exercise activities is one of dependent on and independent of one of user age and other health related factors;
(c) user health related pharmacy mobile application usage activities includes one of
downloading the pharmacy mobile application for prescription refills;
using the pharmacy mobile application to order prescription refill; and
using the pharmacy mobile application or website to set up a reminder for the user to take a prescription medication,
(d) user health related pharmaceutical usage activities includes one of
enrolling in a pharmacy refill synchronization program;
taking a prescription medication;
using the pharmacy mobile application to remind the user to refill a prescription;
picking up a filled prescription from the pharmacy;
maintaining a minimal adherence to maintenance medications at a level of one of greater than 75%, greater than 78%, and greater than 80%, where maintenance medications include one of blood pressure, hypertension, and cholesterol medications; and
picking up filled medications from the pharmacy on time;
(e) user participation in pharmacy healthcare delivery includes one of
receiving a vaccine at the pharmacy;
taking blood pressure at the pharmacy;
being counseled by a pharmacy pharmacist regarding a medication;
setting health goals with the pharmacy;
meeting health goals set with the pharmacy; and
conducting a comprehensive medication review (CMR) with a staff member or pharmacist at the pharmacy;
(f) user health monitoring activities includes one of
sleep monitoring;
blood glucose monitoring;
testing hemoglobin A1c;
blood pressure monitoring;
the user sending the pharmacy a lab report; and
the user's doctor sending the pharmacy lab report; and
(g) user health maintenance or improvement includes one of
maintaining a target BMI;
making a set amount of progress in attaining a target BMI;
attaining a minimum amount of sleep;
maintaining a blood pressure that is in a normal range for the user's age;
engaging in a smoking cessation program when the user is a current smoker;
going a set number of days without a cigarette or tobacco product when the user is a current smoker;
meeting standing goals and moving goals as monitored by a user mobile device;
consuming a minimal level of water intake;
consuming a target amount of calories related to health needs of the user
having minimal level of social interactions, where social interactions includes phone calls and texts, and where more points are allocated are for interactions with individuals who are identified as close contacts for the user; and
participating in an activity with a local charity or community group.

20. The system of claim 3 wherein
(a) the central server acts as a conduit for all data between the computing device and the pharmacy server,
(b) user health related exercise activities includes one of
walking a minimum amount of distance/steps a day;
yoga;
swimming;
jogging;
bike riding;
aerobics;
weightlifting; and
single or team sports; and
an amount of points allotted for exercise activities is one of dependent on and independent of one of user age and other health related factors;

(c) user health related pharmacy mobile application usage activities includes one of
  downloading the pharmacy mobile application for prescription refills;
  using the pharmacy mobile application to order prescription refill; and
  using the pharmacy mobile application or website to set up a reminder for the user to take a prescription medication;
(d) user health related pharmaceutical usage activities includes one of
  enrolling in a pharmacy refill synchronization program;
  taking a prescription medication;
  using the pharmacy mobile application to remind the user to refill a prescription;
  picking up a filled prescription from the pharmacy;
  maintaining a minimal adherence to maintenance medications at a level of one of greater than 75%, greater than 78%, and greater than 80%, where maintenance medications include one of blood pressure, hypertension, and cholesterol medications; and
  picking up filled medications from the pharmacy on time;
(e) user participation in pharmacy healthcare delivery includes one of
  receiving a vaccine at the pharmacy;
  taking blood pressure at the pharmacy;
  being counseled by a pharmacy pharmacist regarding a medication;
  setting health goals with the pharmacy;
  meeting health goals set with the pharmacy; and
  conducting a comprehensive medication review (CMR) with a staff member or pharmacist at the pharmacy;
(f) user health monitoring activities includes one of
  sleep monitoring;
  blood glucose monitoring;
  testing hemoglobin A1c;
  blood pressure monitoring;
  the user sending the pharmacy a lab report; and
  the user's doctor sending the pharmacy lab report; and
(g) user health maintenance or improvement includes one of
  maintaining a target BMI;
  making a set amount of progress in attaining a target BMI;
  attaining a minimum amount of sleep;
  maintaining a blood pressure that is in a normal range for the user's age;
  engaging in a smoking cessation program when the user is a current smoker;
  going a set number of days without a cigarette or tobacco product when the user is a current smoker;
  meeting standing goals and moving goals as monitored by a user mobile device;
  consuming a minimal level of water intake;
  consuming a target amount of calories related to health needs of the user
  having minimal level of social interactions, where social interactions includes phone calls and texts, and where more points are allocated are for interactions with individuals who are identified as close contacts for the user; and
  participating in an activity with a local charity or community group.

\* \* \* \* \*